(12) United States Patent
DeCusatis et al.

(10) Patent No.: US 7,106,021 B2
(45) Date of Patent: Sep. 12, 2006

(54) METHOD, SYSTEM, AND PROGRAM PRODUCT FOR FEEDBACK CONTROL OF A TARGET SYSTEM UTILIZING IMPOSITION OF A PERIODIC MODULATING SIGNAL ONTO A COMMAND SIGNAL

(75) Inventors: Casimer M. DeCusatis, Poughkeepsie, NY (US); Timothy Matthew Trifilo, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/839,642

(22) Filed: May 4, 2004

(65) Prior Publication Data

US 2005/0248305 A1 Nov. 10, 2005

(51) Int. Cl.
G05B 1/02 (2006.01)
G05B 11/28 (2006.01)

(52) U.S. Cl. ...................... 318/606; 318/599; 318/609; 318/610

(58) Field of Classification Search ................ 318/606, 318/599, 684, 811, 139, 138, 608, 607, 459, 318/609, 610
See application file for complete search history.

(56) References Cited

U.S. PATENT DOCUMENTS

| | | | | |
|---|---|---|---|---|
| 3,717,859 A | * | 2/1973 | Walter | 340/648 |
| 4,048,554 A | * | 9/1977 | Stich | 363/98 |
| 4,050,006 A | * | 9/1977 | Stich | 363/98 |
| 4,088,935 A | * | 5/1978 | D'Atre et al. | 318/802 |
| 4,455,680 A | | 6/1984 | Villarreal et al. | 455/208 |
| 4,719,400 A | * | 1/1988 | Kurakake et al. | 318/811 |
| 5,356,949 A | * | 10/1994 | Komiyama et al. | 522/102 |
| 5,506,487 A | * | 4/1996 | Young et al. | 318/811 |
| 5,631,999 A | * | 5/1997 | Dinsmore | 388/805 |
| 5,949,203 A | * | 9/1999 | Buthker | 318/254 |
| 5,986,419 A | * | 11/1999 | Archer et al. | 318/254 |
| 5,990,641 A | * | 11/1999 | Van Buul et al. | 318/254 |
| 6,016,043 A | * | 1/2000 | Motzko et al. | 318/606 |
| 6,122,579 A | * | 9/2000 | Collier-Hallman et al. | 701/41 |
| 6,252,362 B1 | * | 6/2001 | White et al. | 318/254 |
| 6,388,420 B1 | * | 5/2002 | Jansen et al. | 318/799 |

(Continued)

OTHER PUBLICATIONS

Erickson, K.J. and Greenberg, R., "Method to Synchronize Direct Access Storage Device Spindles Using Off-the-Shelf Hardware and Digital Control Techniques," IBM TDB, vol. 33, No. 4, pp. 356-358 (Sep. 1990).

*Primary Examiner*—Paul Ip
(74) *Attorney, Agent, or Firm*—Lily Neff, Esq.; Stephen M. Hladik, Esq.; Heslin Rothenberg Farley & Mesiti, P.C.

(57) ABSTRACT

Feedback control of a target system is provided which utilizes the imposition of a periodic modulating signal onto a command signal of a controller. The command signal with the period modulating signal imposed thereon is input to the target system to be controlled. A response of the target system to a manifestation of the periodic modulating signal in the command signal is detected, and a feedback signal is produced from the detected response. The periodic modulating signal and the feedback signal are processed together to produce an error signal, and the command signal is modified in accordance with the error signal to drive the current state of the target system toward a desired state, wherein the periodic modulating signal facilitates control of the target system.

6 Claims, 10 Drawing Sheets

U.S. PATENT DOCUMENTS

| | | | | |
|---|---|---|---|---|
| 6,618,631 B1* | 9/2003 | Johnson et al. | | 700/28 |
| 6,628,096 B1* | 9/2003 | Chen | | 318/254 |
| 6,686,714 B1* | 2/2004 | Trifilo | | 318/439 |
| 6,700,344 B1* | 3/2004 | Krishnamoorthy et al. | | 318/461 |
| 6,710,567 B1* | 3/2004 | Heydt et al. | | 318/560 |
| 6,898,046 B1* | 5/2005 | Sri-Jayantha et al. | | 360/77.02 |
| 6,979,970 B1* | 12/2005 | Iwanaga et al. | | 318/599 |
| 6,998,801 B1* | 2/2006 | Kurosawa et al. | | 318/254 |
| 2002/0135333 A1* | 9/2002 | Heydt et al. | | 318/560 |
| 2003/0006723 A1* | 1/2003 | Sul et al. | | 318/127 |
| 2003/0184249 A1* | 10/2003 | Heydt et al. | | 318/560 |
| 2004/0070362 A1* | 4/2004 | Patel et al. | | 318/701 |
| 2004/0080289 A1* | 4/2004 | Kawaji et al. | | 318/254 |
| 2004/0145334 A1* | 7/2004 | Virtanen | | 318/712 |
| 2004/0263104 A1* | 12/2004 | Iwanaga et al. | | 318/439 |
| 2005/0001583 A1* | 1/2005 | Hinkkanen | | 318/807 |

* cited by examiner

US 7,106,021 B2

METHOD, SYSTEM, AND PROGRAM PRODUCT FOR FEEDBACK CONTROL OF A TARGET SYSTEM UTILIZING IMPOSITION OF A PERIODIC MODULATING SIGNAL ONTO A COMMAND SIGNAL

TECHNICAL FIELD

This invention relates in general to feedback control systems, and more particularly, to feedback control systems in which a periodic modulating signal is imposed onto a controller's command signal.

BACKGROUND OF THE INVENTION

Feedback control systems typically use sensors to measure states of the target system to be controlled by the control system. For example, optical sensors and Hall effect devices produce rotor position signals in feedback control systems for brushless direct current motors. However, such sensors add cost and complexity to a system and may also require maintenance from time to time to assure continued proper operation. Such sensors can also be a common point of failure in systems under feedback control.

As a result of the disadvantages of many sensor devices, sensorless feedback control systems, which are not based on direct sensing of target system states, are attractive for some applications. For example, the back electromotive force (EMF) generated by stator windings of a brushless DC motor as its magnetized rotor rotates can be detected and used to determine rotor position. The transitions in the resulting back-EMF signal indicate times at which the rotor is in known positions.

Existing feedback control systems drive the phase error, i.e. the difference between a command signal and the target system's response to the command signal, toward zero. Such a feedback control system is point optimized. However, rather than simply nulling the phase error and converging to a single operating point, it would be advantageous for a feedback control system to be able to track an error signal function, which is the difference between the actual state and desired state of the system, in order to deliberately run the motor with a non-zero phase error. The present invention provides a feedback control technique which provides this capability.

SUMMARY OF THE INVENTION

The shortcomings of the prior art are overcome and additional advantages are provided through the provision of a method of feedback control utilizing the imposition of a periodic modulating signal onto a command signal of a controller. Pursuant to the method, the command signal with the periodic modulating signal imposed thereon is input to a target system to be controlled. A response of the target system to a manifestation of the periodic modulating signal in the command signal is detected, and a feedback signal is produced from the detected response. The periodic modulating signal and the feedback signal are processed together to produce an error signal, and the command signal is modified in accordance with the error signal to drive the current state of the target system toward a desired state, wherein the periodic modulating signal facilitates control of the target system.

In an enhanced embodiment, the target system comprises a motor and a motor drive circuit. In this embodiment, a motor drive signal is generated based on the command signal with the periodic modulating signal imposed thereon, wherein the motor drive signal is an input used to drive the motor. Also, the detecting further comprises measuring a back-EMF signal generated by the motor and extracting the motor's response to the manifestation of the periodic modulating signal in the command signal from the back-EMF signal. In this embodiment, the current state of the motor comprises the actual rotational speed of the motor; while the desired state comprises the desired rotational speed of the motor.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
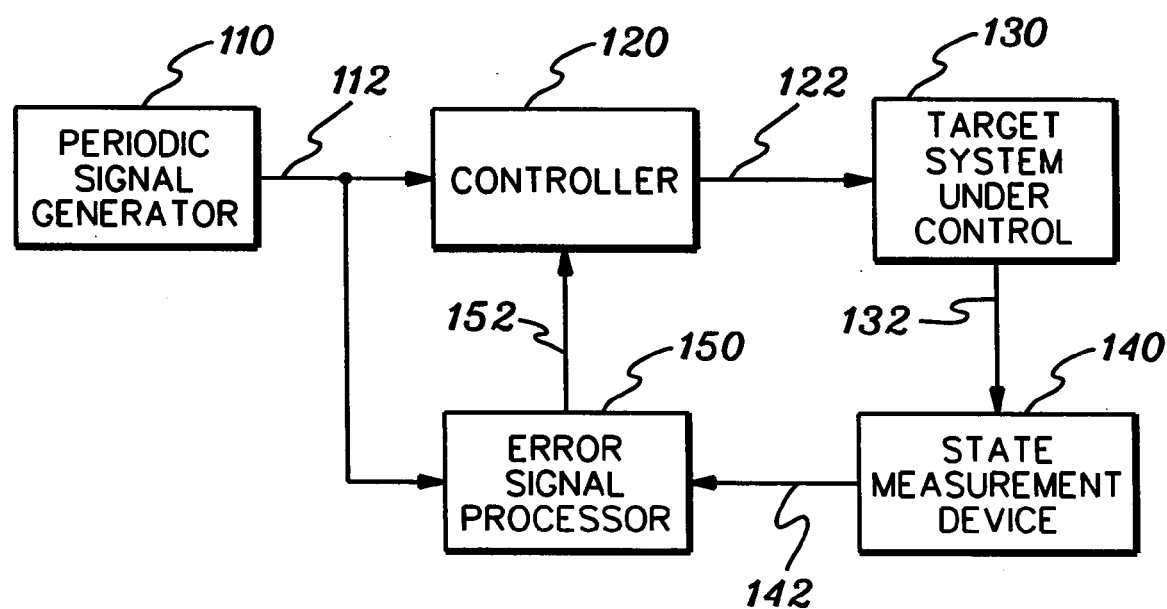
FIG. 1 illustrates one embodiment of a state control loop for a target system utilizing feedback control, in accordance with an aspect of the present invention.

FIG. 1 illustrates one embodiment of a state control loop for a system utilizing feedback control, in accordance with an aspect of the present invention. Controller 120 generates control signal 122 to control a target system 130 in accordance with the desired target system action and an error signal 152. Additionally, controller 120 receives periodic signal 112 from periodic signal generator 110, and a manifestation of periodic signal 112 is imposed on control signal 122. State measurement device 140 detects the target system's response 132 to control signal 122 and derives feedback signal 142 from the detected response, where feedback signal 142 is a measure of the target system's response to the manifestation of periodic signal 112 imposed on control signal 122. Error signal processor 150 completes the state control loop by generating error signal 152 as a function of periodic signal 112 and feedback signal 142. In another example of the embodiment of the state control loop illustrated in FIG. 1, the desired target system action is indicated by a command signal, which is input to controller 120.

Figure 2:
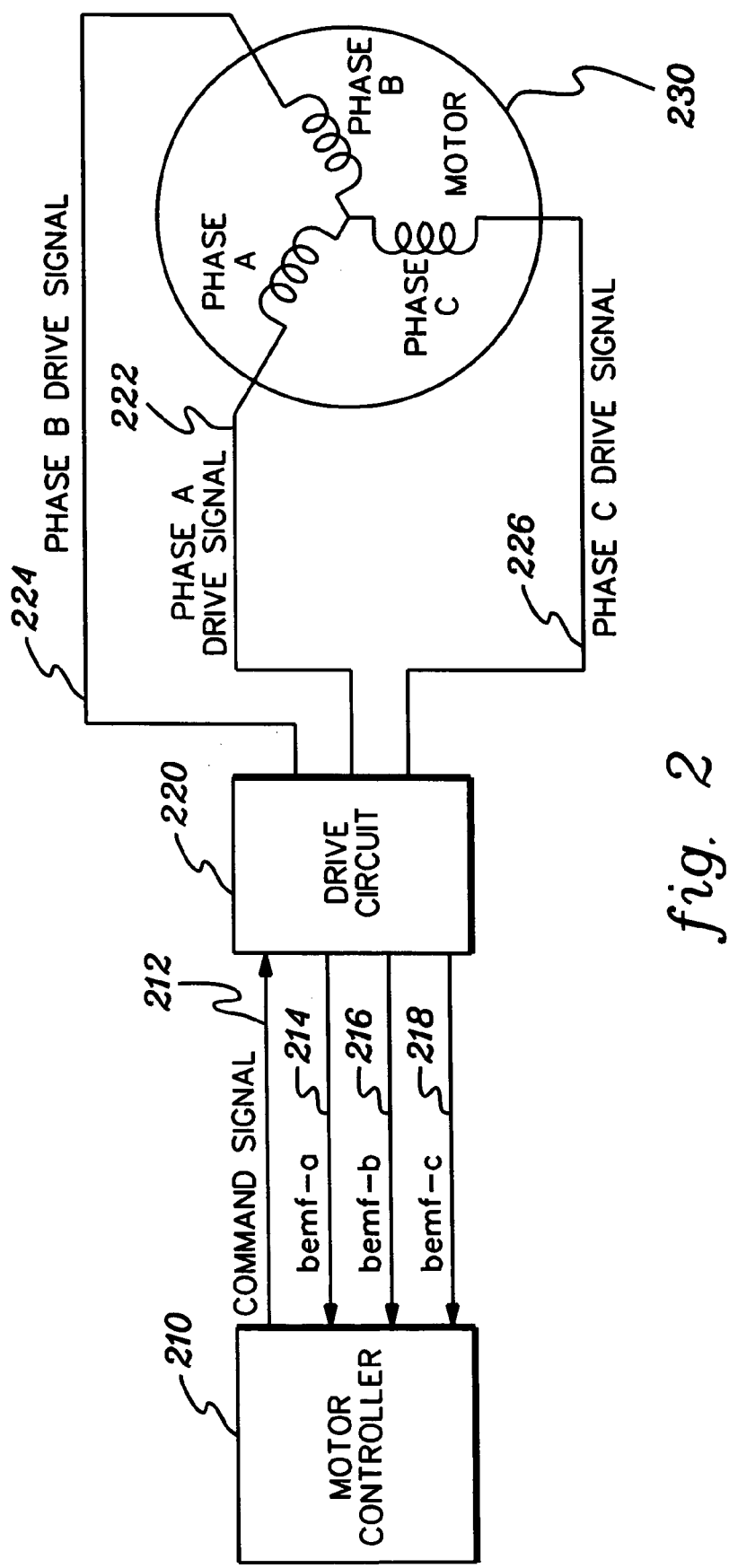
FIG. 2 illustrates one example of a servomotor system environment for a DC-motor, in accordance with an aspect of the present invention.

FIG. 2 illustrates one example of a servomotor system environment for a DC-motor, in accordance with an aspect of the present invention, as an exemplary system utilizing feedback control with a state control loop. Motor controller 210 generates command signal 212, which is an input to drive circuit 220. Drive circuit 220 produces motor drive signals which drive motor 230. In the embodiment illustrated in FIG. 2, motor 230 is a brushless DC motor having three stator phases (A, B, and C), and drive circuit 220 produces phase A drive signal on phase A interface 222, phase B drive signal on phase B interface 224, and phase C drive signal on phase C interface 226 to drive phase A, phase B, and phase C of the motor, respectively.

The rotation of the motor's rotor induces a time-varying voltage across the phase windings of the motor's stator as the poles of the rotor pass by the stator windings. This induced voltage across each stator phase winding, which results from the generating action of the motor, is known as a "back electromotive force" or "back EMF". The back EMFs for phases A, B, and C of motor 230 can be detected on phase interface A 222, phase interface B 224, and phase interface C 226, respectively, by drive circuit 220 and provided as input signals bemf-a 214, bemf-b 216, and bemf-c 218, respectively, to motor controller 210. The servomotor system environment for a DC-motor illustrated in FIG. 2 can be used to drive a load such as a fan for example.

Figure 3:
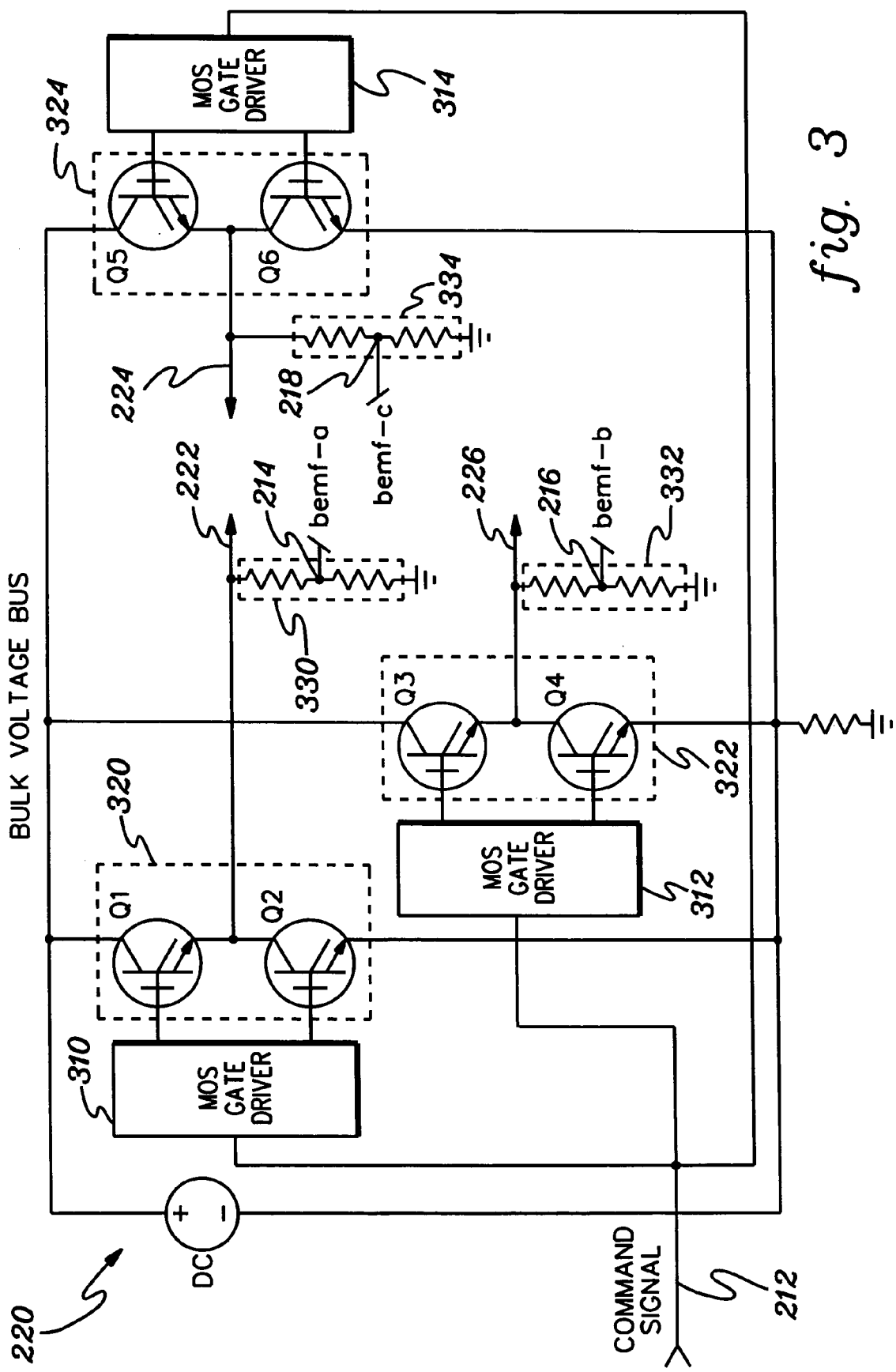
FIG. 3 illustrates one embodiment of the drive circuit of FIG. 2.

FIG. 3 illustrates one embodiment of drive circuit 220 of FIG. 2. Command signal 212 received from the motor controller is an input to gate driver circuits 310, 312, and 314 for power transistor pairs 320, 322, and 324, respectively. Each pair of power transistors drives a stator phase of the motor. Motor drive signals are produced on phase interface A 222, phase interface B 224, and phase interface C 226 by power transistor pairs 320, 322, and 324, respectively, which are driven by gate driver circuits 310, 312, and 314, respectively. Resistive voltage divider circuits 330, 332, and 334 coupled to phase interfaces A, B, and C, respectively, produce back-EMF signals bemf-a 214, bemf-b 216, and bemf-c 218, respectively. Other means for detecting back-EMF signals, known to those with ordinary skill in the art, may also be used in accordance with the present invention.

Figure 4:
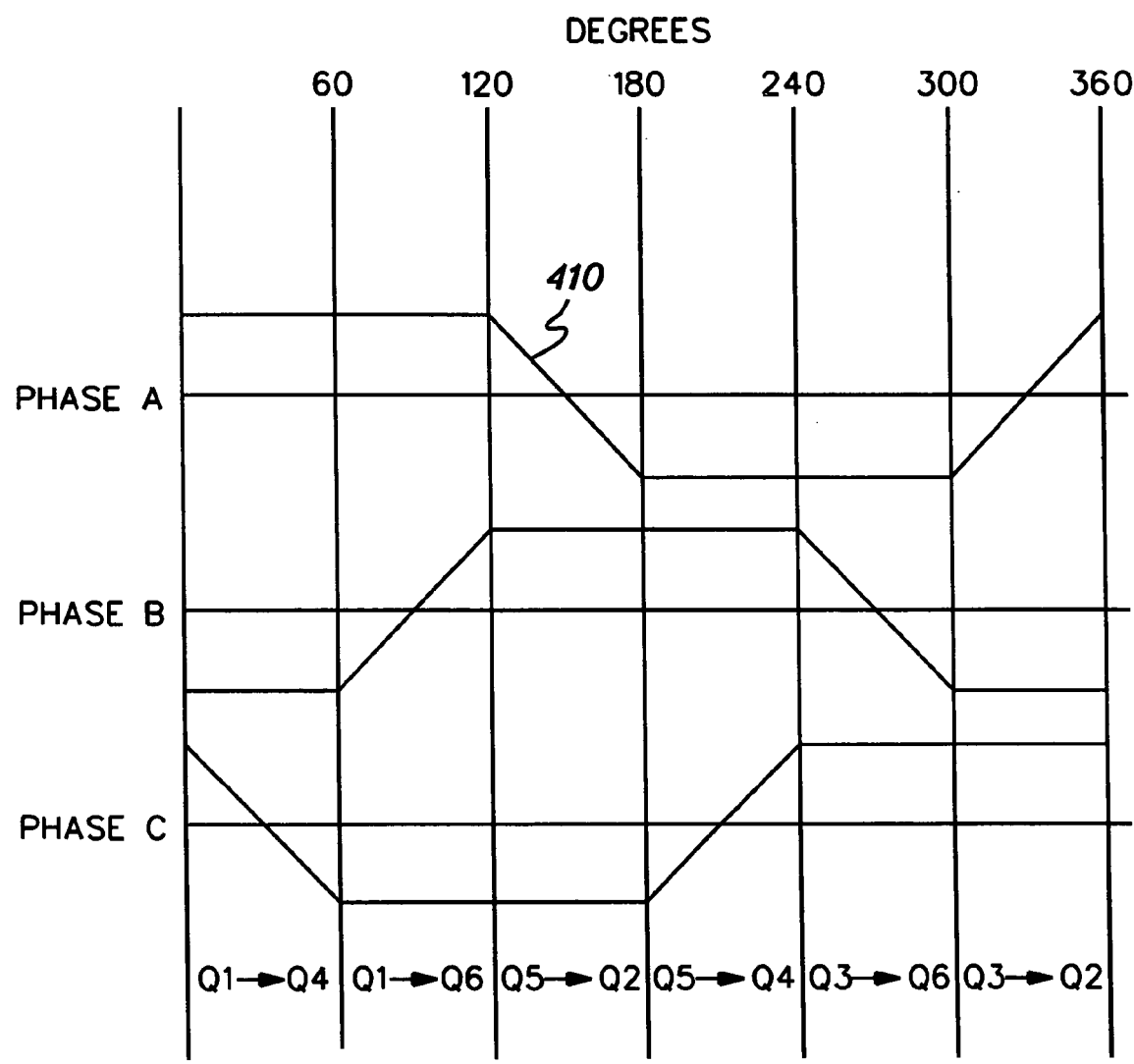
FIG. 4 illustrates ideal back-EMF waveforms for the three phases of a three-phase brushless DC motor.

FIG. 4 illustrates ideal back-EMF waveforms for the three phases of a three-phase brushless DC motor having two rotor poles. In this example, the period of ideal phase A back-EMF waveform 410 is equal to the time for one rotation of the rotor (360 spatial degrees). The reference line crossed by phase A back-EMF waveform 410 represents the voltage level of electrical neutral in the system. The transistor names and arrows indicate the direction of current flow for the time intervals corresponding to the back-EMF waveform segments. The ideal back-EMF waveforms of FIG. 4 have trapezoidal shapes.

Figure 5:
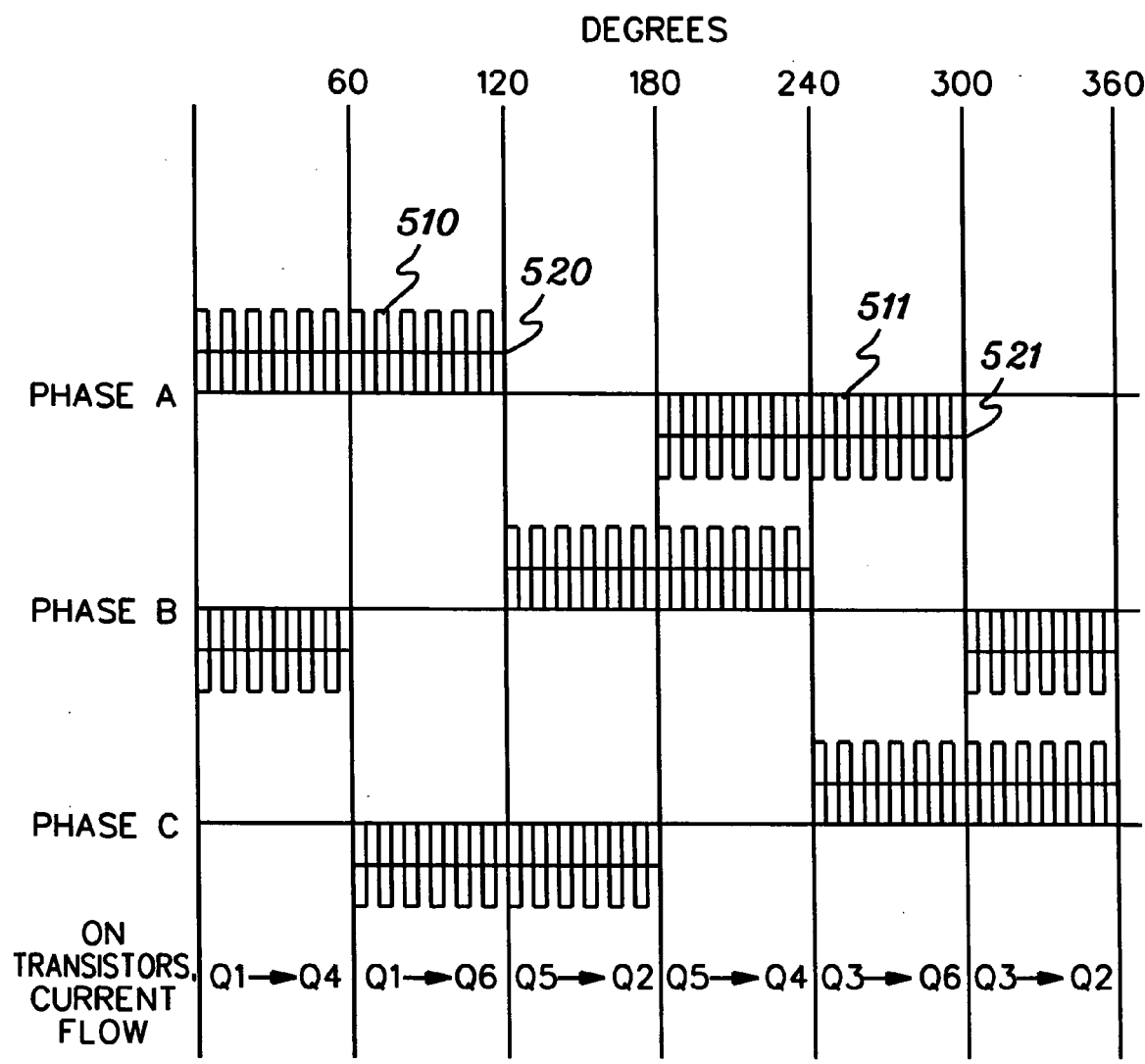
FIG. 5 illustrates one of embodiment of the drive signals to each phase of a three-phase brushless DC motor.

FIG. 5 illustrates one of embodiment of the drive signals to each phase of a three-phase brushless DC motor having two rotor poles when the motor is driven to rotate at the same speed as is depicted in the back-EMF waveforms of FIG. 4. The features of the drive signal for phase A are discussed in the following as an example. This drive signal comprises positive pulse-width modulated pulses 510, which have positive average level 520, for a time period corresponding to 120 degrees of rotation followed by the neutral voltage level for a period corresponding to 60 degrees of rotation and negative pulse-width modulated pulses 511, which have negative average level 521, for a time period corresponding to 120 degrees of rotation followed by the neutral voltage level for a period corresponding to 60 degrees of rotation. The transistors, which are ON, are indicated for various time intervals, and the arrows indicate the direction of current flow.

Figure 6A:
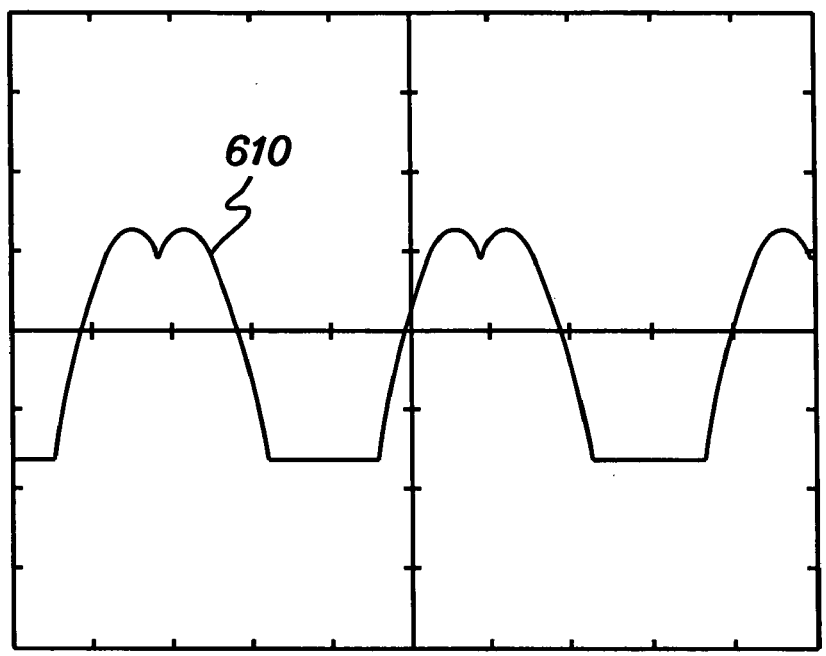
FIGS. 6a and 6b illustrate exemplary measured back-EMF signals for two brushless DC motors operating as generators.
Figure 6B:
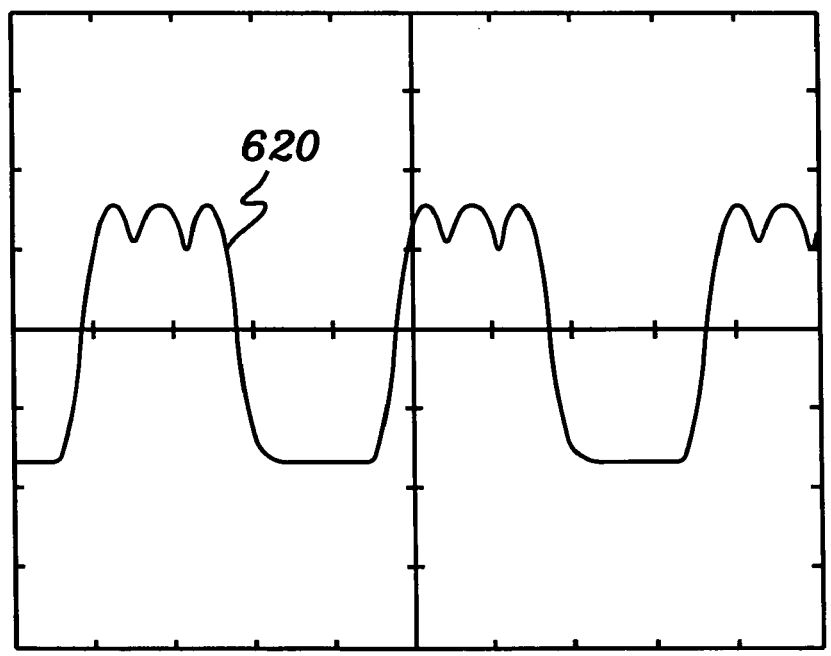

FIGS. 6a and 6b illustrate exemplary measured back-EMF signals for two brushless DC motors operating as generators. Back-EMF waveform 610 of FIG. 6a and back-EMF waveform 620 of FIG. 6b are measured back-EMF signals detected in one stator phase of two different brushless DC motors. Both back-EMF waveform 610 and back-EMF waveform 620 differ from the ideal trapezoidal back-EMF waveforms of FIG. 4, and they differ from each other. The deviation of back-EMF waveforms 610 and 620 from the ideal trapezoidal back-EMF waveforms results from the fact that rotor magnets of the motors measured do not have linear flux gradients. It is also apparent from FIGS. 6a and 6b that there is variation among the back-EMF waveforms generated by different motors. (It should be noted that the flattened bottoms of back-EMF waveforms 610 and 620 are artifacts of the rectifying action of diodes included in the packages comprising the power transistors of power transistor pairs 320, 322, and 324. The actual back-EMF voltages produced by the motors are approximately symmetrical.) The variations among measured back-EMF waveforms and from the ideal back-EMF waveform cause noise in feedback control systems which are based on assumptions about the characteristic shape of the actual back-EMF generated by a spinning motor.

Figure 7:
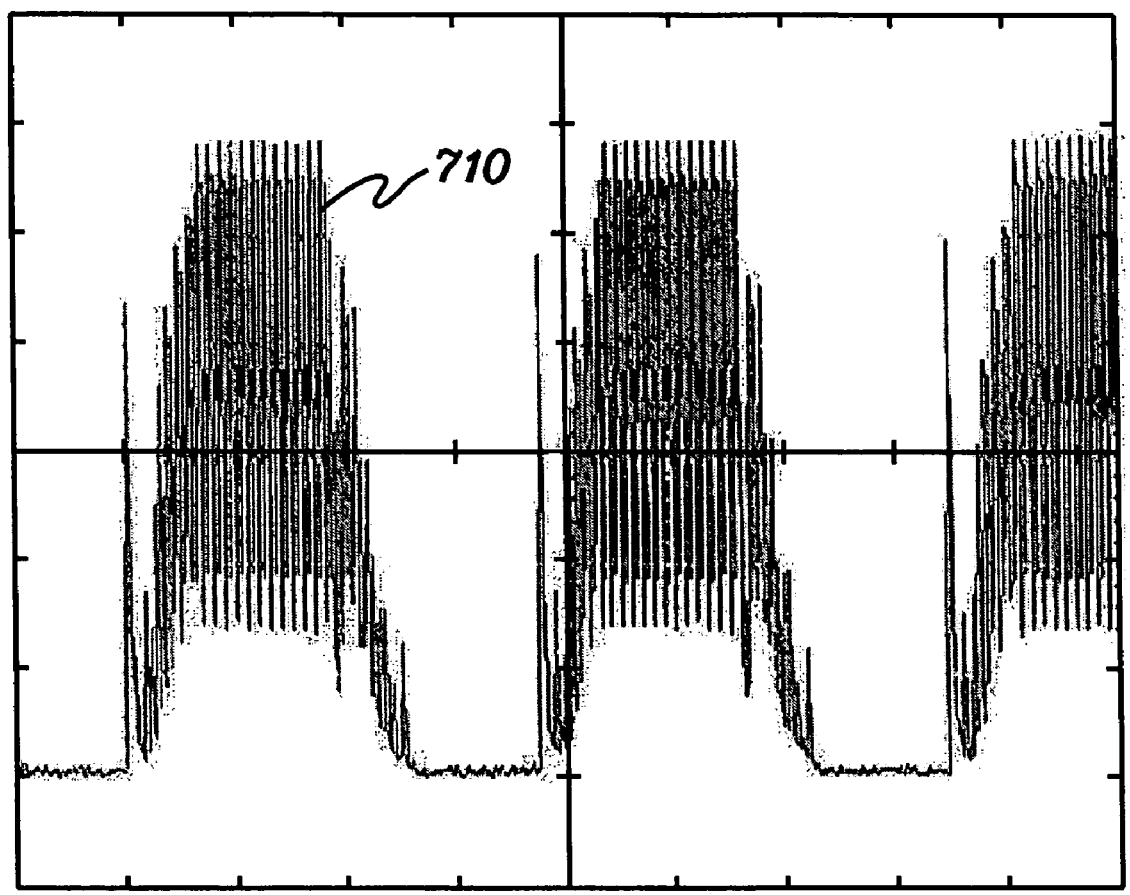
FIG. 7 illustrates an exemplary measured back-EMF signal for one phase of a brushless DC motor being driven by a 10 kHz pulse-width modulation drive signal.

Another source of noise in the detected back-EMF signal in feedback control systems for brushless DC motors is the pulse-width modulated motor drive signal. One example of this type of motor drive signal for three motor phases is shown in FIG. 5 as discussed previously. FIG. 7 illustrates an exemplary measured back-EMF signal for one phase of a brushless DC motor being driven by a 10 kHz pulse-width modulation drive signal. In FIG. 7, the superposition of the motor drive signal comprising pulses similar to pulse-width modulated pulses 510 of FIG. 5 onto the back-EMF generated by the motor is apparent in detected back-EMF signal 710.

Figure 8:
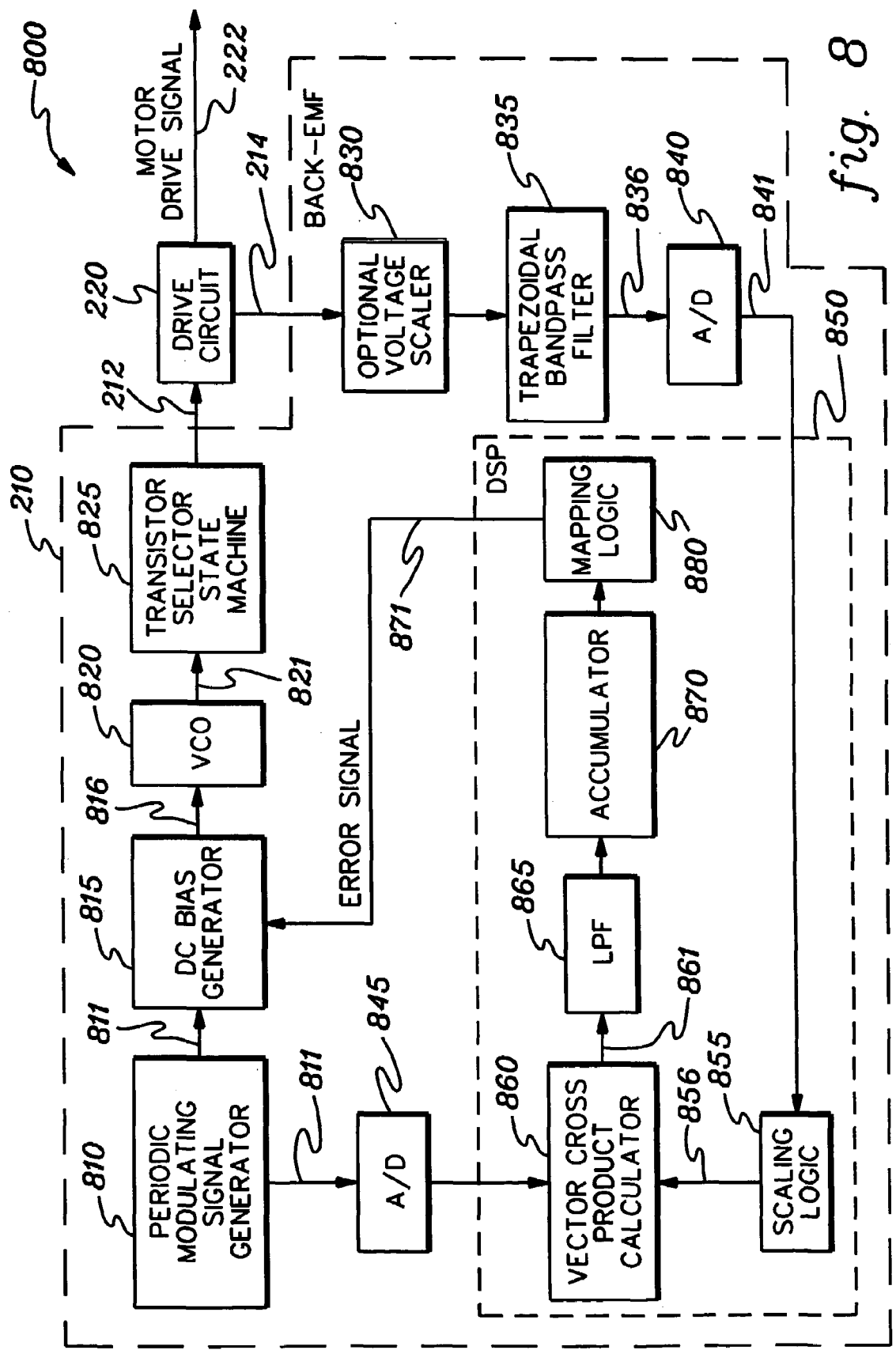
FIG. 8 illustrates one embodiment of a speed control loop of a servomotor system, which utilizes an embodiment of the motor controller of FIG. 2, in accordance with an aspect of the present invention.

Because of the sources of noise in feedback control systems for brushless DC motors which utilize motor back-EMF as a feedback signal, it is advantageous to impose a periodic modulating signal onto the drive signal and to detect the motor's response to the imposed periodic modulating signal so that the motor's response to the imposed periodic modulating signal may be used as feedback in a closed loop control system. FIG. 8 illustrates one embodiment of speed control loop 800 of a servomotor system, which utilizes an embodiment of motor controller 210 of FIG. 2, in accordance with an aspect of the present invention. The embodiment of motor controller 210 illustrated in the block diagram of FIG. 8 utilizes a periodic modulating signal to facilitate the acquisition and maintenance of lock in the speed control loop embodiment illustrated in FIG. 8. This embodiment of motor controller 210 and the operation of speed control loop 800 are described in more detail below.

As discussed previously with respect to FIG. 2, motor controller 210 generates command signal 212, which is input to drive circuit 220 to produce drive signals 222, 224, and 226 for motor phases A, B, and C, respectively. For clarity, only phase A drive signal 222 and the back-EMF detected by drive circuit 220 for phase A of the motor, bemf-a 214, are shown in FIG. 8. In accordance with the embodiment of motor controller 210 illustrated in FIG. 8, the voltage level of bias signal 816, which is the output of DC bias generator 815, is proportional to the desired speed of the motor; bias signal 816 may vary over time in response to inputs received by DC bias generator 815.

In one embodiment of the present invention, periodic modulating signal generator 810 generates periodic modulating signal 811, which is input DC bias generator 815. DC bias generator adds periodic modulating signal 811 to the level of bias signal 816 that corresponds to the desired rotational speed to effect an amplitude modulation of bias signal 816. In addition, error signal 871 from digital signal processor 850 is added to bias signal 816 to drive the motor toward the desired rotational speed.

Voltage controlled oscillator (VCO) 820 receives bias signal 816 (including the added periodic modulating signal and error signal) and generates a periodic clock signal 821 having an instantaneous frequency that is proportional to the instantaneous voltage level of bias signal 816. Transistor selector state machine 825 is clocked by clock signal 821 received from the VCO 820 to generate command signal 212, which is input to drive circuit 220. As a result, periodic modulating signal 811 is imposed on command signal 212 from motor controller 210, and command signal 212 is also adjusted in accordance with error signal 871.

Drive circuit 220 produces phase A drive signal on phase A interface 222 based on command signal 212. Although not illustrated in FIG. 8, drive circuit 220 similarly produces drive signals for the other motor phases on the corresponding motor phase interfaces. Drive circuit 220 also detects the back EMF generated by the motor on one motor phase interface, for example, phase interface A 222 as shown in FIG. 8. The back-EMF detected on phase interface A 222, bemf-a 214, is fed back to motor controller 210 as an input signal. Voltage scaler 830 amplifies bemf-a 214 and outputs a scaled bemf-a signal to bandpass filter 835. Bandpass filter 835 has a center frequency that is approximately equal to the fundamental frequency of the back-EMF signal generated by the motor when it is operating at the desired speed. In other words, the center frequency of bandpass filter 835 is proportional to the desired rotational speed of the motor's rotor. The passband of bandpass filter 835 extends from approximately f_m Hz below this center frequency to approximately f_m Hz above this center frequency, where f_m is the fundamental frequency of periodic modulating signal 811. Essentially, filtered bemf-a signal 836 produced by bandpass filter 835 comprises the motor's response to the manifestation of periodic modulating signal 811 in the phase A drive signal on phase interface A 222. This filtered back-EMF signal is input to analog-to-digital converter (A/D) 840. Analog-to-digital converter 840 samples filtered bemf-a signal 836, and the resulting filtered and sampled back-EMF signal is input to digital signal processor (DSP) 850.

Digital signal processor 850 comprises one embodiment of error signal processor 150 of the state control loop embodiment illustrated in FIG. 1, and it generates error signal 871 as a function of the sampled periodic modulating signal from analog-to-digital converter 845 and the filtered and sampled back-EMF signal from analog-to-digital converter 840. Digital signal processor 850 calculates the correlation between the sampled periodic modulating signal and the filtered and sampled back-EMF signal, and then maps the correlation result to error signal 871. The magnitude of error signal 871 computed by DSP 850 is proportional to the difference between the desired state and the current state of the target system. In one example, wherein the target system is direct-current motor and an associated motor drive circuit, the magnitude of error signal 871 is proportional to the difference between the desired rotation speed of the motor and the actual rotational speed. The sign of error signal 871 reflects whether the current state of the target system is less than or greater than the desired state. In one example, wherein the target system is direct-current motor and an associated motor drive circuit, error signal 871 is positive if the actual rotational speed of the motor is less than the desired rotational speed, and error signal 871 is negative if the actual rotational speed of the motor is greater then the desired rotational speed.

The structure of the processing by of digital signal processor 850 is described in more detail in the following. The magnitude of the filtered and sampled back-EMF signal 841 from analog-to-digital converter 840 adjusted by scaling logic 855 to produce a scaled feedback signal 856. Vector cross product calculator 860 calculates the vector cross product of scaled feedback signal 856 from scaling logic 855 and the sampled periodic modulating signal from analog-to-digital converter 845 to produce vector cross product signal 861. Vector cross product signal 861 is filtered by lowpass filter 865, and the filtered vector cross product signal from lowpass filter 865 is input to accumulator 870. The output of accumulator 870 is input to mapping logic 880, which maps the correlation value output by accumulator 870 into error signal 871, which is output by digital signal processor 850. Error signal 871 is input to DC bias generator 815 to close speed control loop 800.

In one example, mapping logic 880 utilizes the correlation value output by accumulator 870 as an index to a look-up table, which stores samples of error signal 871 corresponding to various values of the correlation value output by accumulator 870.

In digital signal processor 850 of FIG. 8, the processing of vector cross product calculator 860 and accumulator 870 together effect the correlation calculation of the sampled periodic modulating signal with the filtered and sampled back-EMF signal. Lowpass filter 865 attenuates the pulse-width modulation carrier noise in that is present in vector cross product signal 861. The pulse-width modulation carrier noise may be introduced into vector cross product signal 861 because some pulse-width modulation carrier component may remain in filtered bemf-a signal 836 produced by bandpass filter 835 due to the fact that it is a much stronger signal than the back-EMF signal generated by the motor.

Figure 9:
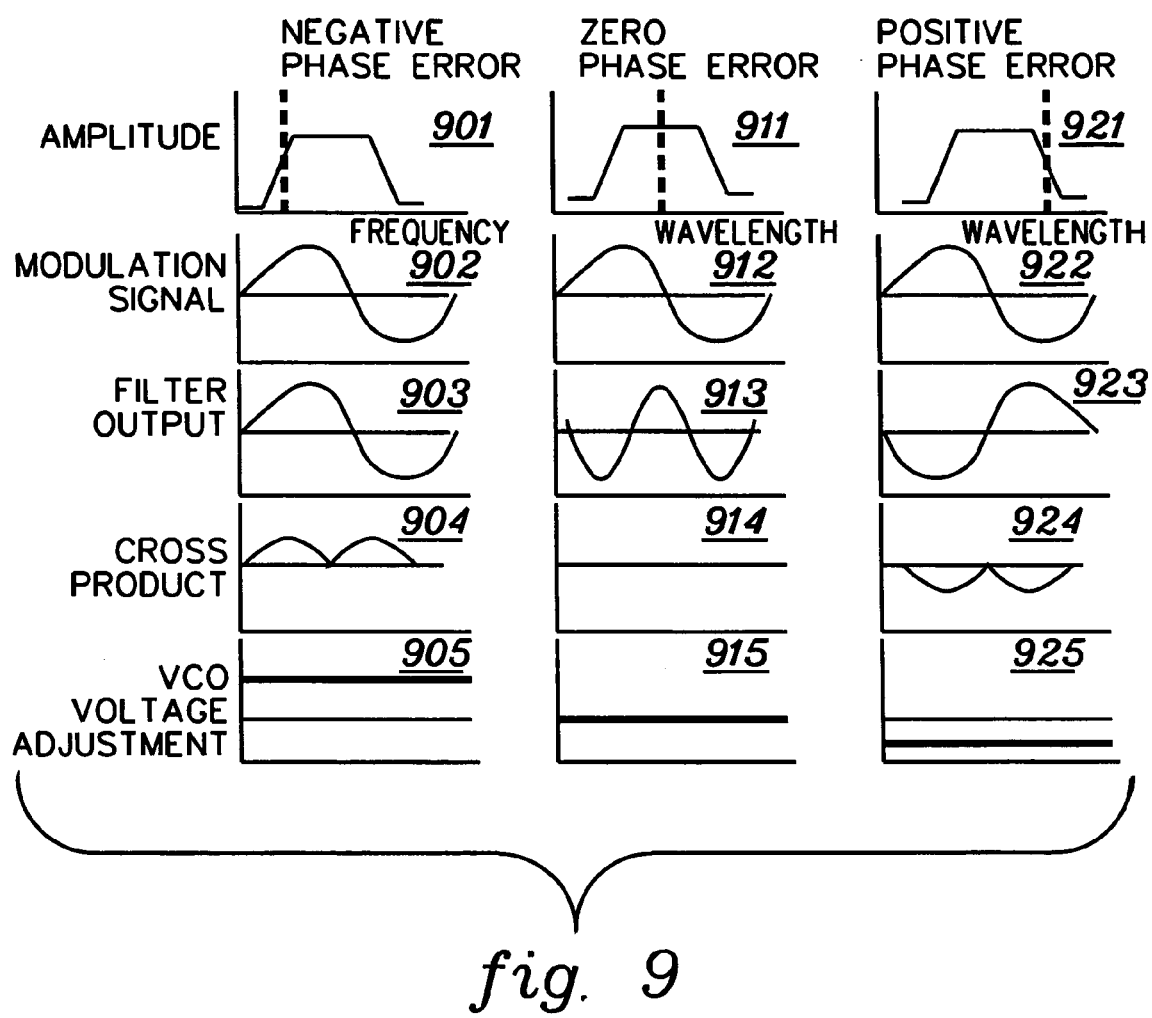
FIG. 9 illustrates the instantaneous frequency spectrum of the back-EMF of a brushless DC motor and several signal waveforms as a function of time for the motor controller embodiment of FIG. 8 for negative, zero, and positive phase error conditions.
Figure 10:
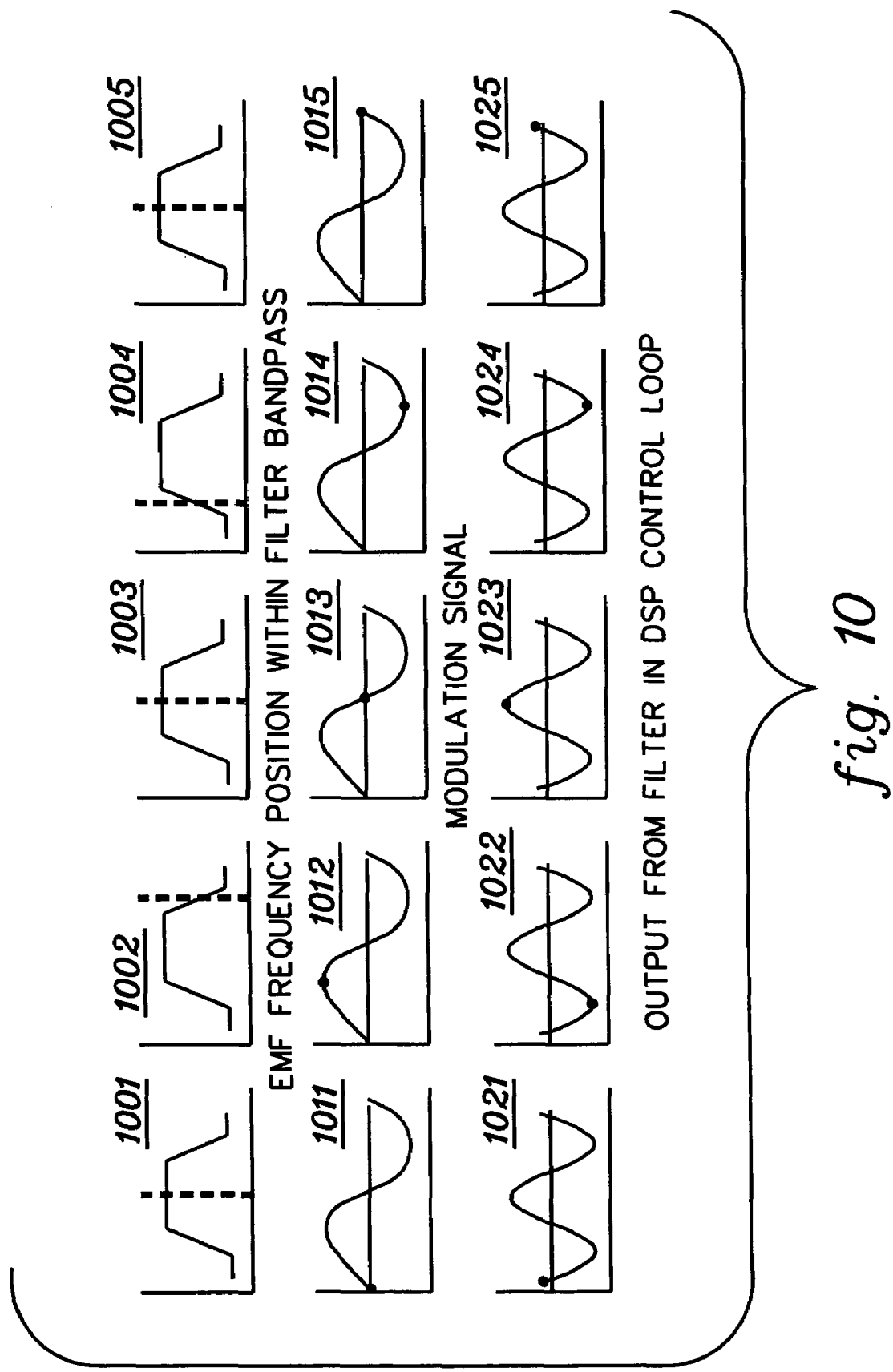
FIG. 10 illustrates a time sequence of the instantaneous frequency spectrum of the back-EMF of a brushless DC motor and corresponding samples of two signal waveforms for the motor controller embodiment of FIG. 8.

The frequency spectra and waveforms shown in FIGS. 9 and 10 illustrate the operation of speed control loop 800 in FIG. 8. FIG. 9 illustrates the instantaneous frequency spectrum of the back-EMF of a brushless DC motor together with an exemplary frequency response of bandpass filter 835 and several signal waveforms as a function of time for the motor controller embodiment of FIG. 8 for negative, zero, and positive phase error conditions. More particularly, frequency spectrum 901, filtered back-EMF signal waveform 903, vector cross product signal waveform 904, and error signal waveform 905 are exemplary resulting waveforms for the negative phase error condition. The corresponding periodic modulating signal waveform 902 is illustrated on the same time scale as filtered back-EMF signal waveform 903, vector cross product signal waveform 904, and error signal waveform 905 as a reference. Similarly, frequency spectrum 911, filtered back-EMF signal waveform 913, vector cross product signal waveform 914, and error signal waveform 915 are exemplary resulting waveforms for the zero phase error condition when periodic modulating signal waveform 912 is imposed onto the command signal 212 of FIG. 8. For the positive phase error condition, frequency spectrum 921, filtered back-EMF signal waveform 923, vector cross product signal waveform 924, and error signal waveform 925 are exemplary resulting waveforms when periodic modulating signal waveform 922 is imposed onto the command signal. Filtered back-EMF signal waveforms 903, 913, and 923 are examples of filtered bemf-a signal 836 for the negative, zero, and positive phase error conditions, respectively; vector cross product signal waveforms 904, 914, 924 are examples of vector cross product signal 861 for the negative, zero, and positive phase error conditions, respectively; error signal waveforms 905, 915, and 925 are examples of error signal 871 for the negative, zero, and positive phase error conditions, respectively.

Note that when the phase error is zero, the output of bandpass filter 835, filtered back-EMF signal waveform 913, has twice the frequency of periodic modulating signal waveform 912. This behavior can be explained by the time sequence of the instantaneous frequency spectrum of the back-EMF of a brushless DC motor and corresponding sequences of periodic modulating signal waveforms and filtered back-EMF signal waveforms illustrated in FIG. 10 for the motor controller embodiment of FIG. 8. In FIG. 10, the dots on periodic modulation signal waveforms 1011, 1012, 1013, 1014, and 1015 and filtered back-EMF signal waveforms 1021, 1022, 1023, 1024, and 1025 indicate the sampling times which correspond to instantaneous frequency spectra of the back-EMF 1001, 1002, 1003, 1004, and 1005, respectively. From these time sequences of waveforms and spectra, it is apparent that the frequency spectrum of the back-EMF signal passes through the peak of the frequency response of bandpass filter 835 twice during one cycle of the modulating signal.

The discussion of the operation of speed control loop 800 in FIG. 8 continues below with reference again to FIG. 9. In contrast to the zero phase error condition, when the phase error is either positive or negative, this frequency doubling is not present in the filtered back-EMF signal, and filtered bemf-a signal 836 is either in phase (filtered back-EMF signal waveform 903) or out of phase (filtered back-EMF signal waveform 923) with the applied periodic modulating signal waveforms 902 or 922, respectively, which are sinusoidal waveforms in the example illustrated in FIG. 9. The resulting vector cross product signal waveform is therefore positive, zero, or negative for the relative phase error conditions illustrated. However, a continuum of waveforms exist for this signal for phase errors lying between the illustrated examples. For these intermediate conditions, frequency doubling may exist during a part of the fundamental period of the vector cross product waveform.

Using the technique of the present invention, it is possible to lock voltage controlled oscillator 820 in FIG. 8 to an arbitrary phase error. Speed control loop 800 generates a bipolar error signal with an amplitude that is proportional to the magnitude of the phase error; this feature can be used to control the VCO and to maintain any desired amount of phase error in servomotor system.

It should be noted that the technique of the present invention does require the peak of the bandpass filter's frequency response to be flat, as illustrated in FIGS. 9 and 10. Depending on the accuracy desired and the amount of filter passband ripple, the feedback loop can be adjusted to track the phase error for any point in the passband of the bandpass filter. Also, derivative signal processing techniques can be utilized if the bandpass filter's passband ripple is large enough to affect the phase error determination.

The vector cross product can be implemented with commercially available components, such as a digital four-quadrant multiplier using a Booth algorithm, for example. The acquisition speeds of commercially available multipliers are sufficient for motor control applications, including driving cooling fans in computer systems. The method of the present invention can also be used to control a speed adaptive bandpass filter that is tunable to match the current motor speed for improved noise immunity.

As would be appreciated readily by one with ordinary skill in the art, the foregoing describes several embodiments of a method, system, and program product for feedback control of a target system, wherein a periodic modulating signal is imposed onto a command signal of a controller. Pursuant to the method, the command signal with the periodic modulating signal imposed thereon is input to a target system to be controlled. A response of the target system to a manifestation of the periodic modulating signal in the command signal is detected, and a feedback signal is produced from the detected response. The periodic modulating signal and the feedback signal are processed together to produce an error signal, and the command signal is modified in accordance with the error signal to drive the current state of the target system toward a desired state, wherein the periodic modulating signal facilitates control of the target system.

In another embodiment, the target system comprises a motor and a motor drive circuit. In this embodiment, a motor drive signal is generated based on the command signal with the periodic modulating signal imposed thereon, wherein the motor drive signal is an input used to drive the motor. Also, the detecting further comprises measuring a back-EMF signal generated by the motor and extracting the motor's response to the manifestation of the periodic modulating signal in the command signal from the back-EMF signal. In this embodiment, the current state of the motor comprises the actual rotational speed of the motor; while the desired state comprises the desired rotational speed of the motor. The motor, motor drive circuit, and controller utilizing the feedback control method in accordance with the present invention comprise a servomotor system.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A feedback control method for a target system to be controlled, said method comprising:
   imposing a periodic modulating signal onto a command signal of a controller, the command signal with the periodic modulating signal imposed thereon being an input to a target system to be controlled;
   detecting a response of the target system to a manifestation of the periodic modulating signal in the command signal and producing a feedback signal therefrom;
   processing the periodic modulating signal and the feedback signal together to produce an error signal, wherein the processing comprises
      correlating the feedback signal with the periodic modulating signal to produce a correlation value and
      mapping the correlation value to the error signal; and
   modifying the command signal in accordance with the error signal to drive a current state of the target system toward a desired state, wherein the periodic modulating signal facilitates control of the target system.

2. The method of claim 1, wherein:
   the correlating comprises calculating a vector cross product of the periodic modulating signal and the feedback signal to produce a vector cross product signal, and integrating the vector cross product signal to obtain the correlation value; and
   wherein the mapping comprises utilizing a look-up table to convert the correlation value to the error signal.

3. A feedback control system for a target system to be controlled, said system comprising:
   means for imposing a periodic modulating signal onto a command signal of a controller, the command signal with the periodic modulating signal imposed thereon being an input to a target system to be controlled;
   means for detecting a response of the target system to a manifestation of the periodic modulating signal in the command signal and producing a feedback signal therefrom;
   means for processing the periodic modulating signal and the feedback signal together to produce an error signal, wherein the means for processing comprises
      means for correlating the feedback signal with the periodic modulating signal to produce a correlation value and
      means for mapping the correlation value to the error signal; and
   means for modifying the command signal in accordance with the error signal to drive a current state of the target system toward a desired state, wherein the periodic modulating signal facilitates control of the target system.

4. The system of claim 3, wherein:
   the means for correlating comprises means for calculating a vector cross product of the periodic modulating signal and the feedback signal to produce a vector cross product signal, and means for integrating the vector cross product signal to obtain the correlation value; and
   wherein the means for mapping comprises means for utilizing a look-up table to convert the correlation value to the error signal.

5. At least one program storage device readable by a machine embodying at least one program of instructions executable by the machine to perform a feedback control method for a target system to be controlled, said method comprising:
   imposing a periodic modulating signal onto a command signal of a controller, the command signal with the periodic modulating signal imposed thereon being an input to a target system to be controlled;
   detecting a response of the target system to a manifestation of the periodic modulating signal in the command signal and producing a feedback signal therefrom;
   processing the periodic modulating signal and the feedback signal together to produce an error signal, wherein the processing comprises
      correlating the feedback signal with the periodic modulating signal to produce a correlation value and
      mapping the correlation value to the error signal; and
   modifying the command signal in accordance with the error signal to drive a current state of the target system toward a desired state, wherein the periodic modulating signal facilitates control of the target system.

6. The at least one program storage device of claim 5, wherein:
   the correlating comprises calculating a vector cross product of the periodic modulating signal and the feedback signal to produce a vector cross product signal, and integrating the vector cross product signal to obtain the correlation value; and
   wherein the mapping comprises utilizing a look-up table to convert the correlation value to the error signal.

* * * * *